(12) United States Patent
Bastow

(10) Patent No.: US 6,759,089 B2
(45) Date of Patent: Jul. 6, 2004

(54) MASKING METHOD

(75) Inventor: David R. Bastow, Tamworth (GB)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/600,788

(22) Filed: Jun. 20, 2003

(65) Prior Publication Data
US 2003/0234558 A1 Dec. 25, 2003

Related U.S. Application Data

(63) Continuation of application No. 08/682,773, filed as application No. PCT/US95/02893 on Mar. 2, 1995, now abandoned.

(30) Foreign Application Priority Data

Mar. 8, 1994 (GB) .............................................. 9404417

(51) Int. Cl.$^7$ ................................................ B05D 1/02
(52) U.S. Cl. ..................... 427/282; 118/504; 118/505; 156/293; 156/297; 428/343
(58) Field of Search ................. 118/504, 505; 156/293, 297; 427/282, 272; 428/343, 158

(56) References Cited

U.S. PATENT DOCUMENTS

| | | | | |
|---|---|---|---|---|
| 1,960,137 A | * | 5/1934 | Brown ........................ 428/41.7 |
| 3,123,656 A | * | 3/1964 | Rochlin ....................... 264/321 |
| 3,844,876 A | * | 10/1974 | Wilson et al. ................ 428/160 |
| 3,869,831 A | * | 3/1975 | Gibb ............................ 451/28 |
| 3,930,069 A | * | 12/1975 | Stephens ..................... 427/142 |
| 4,740,256 A | * | 4/1988 | Vosberg ....................... 156/73.1 |
| 4,996,092 A | * | 2/1991 | Francis et al. ............... 428/157 |
| 5,128,176 A | * | 7/1992 | Schmidt ....................... 427/140 |
| 5,260,097 A | * | 11/1993 | Silvestre ..................... 427/282 |
| 5,871,835 A | | 2/1999 | Voss |
| 5,885,395 A | | 3/1999 | Western |
| 6,086,709 A | | 7/2000 | Hills |
| 6,270,886 B1 | | 8/2001 | Ono et al. |

FOREIGN PATENT DOCUMENTS

| | | | |
|---|---|---|---|
| DE | 297 05 114 U1 | | 8/1997 |
| EP | 0257872 | * | 3/1988 |
| FR | 2042417 | * | 2/1971 |
| FR | 2588875 | * | 4/1987 |
| JP | 3026379 | | 2/1991 |
| WO | WO 90/15668 | * | 12/1990 |
| WO | WO 94/20584 | | 9/1994 |
| WO | WO 99/12654 | | 3/1999 |

\* cited by examiner

Primary Examiner—Laura Edwards
(74) Attorney, Agent, or Firm—William L. Huebsch

(57) ABSTRACT

The "B" post of an automobile between its front and rear doors is masked before the vehicle is painted by (1) providing a resiliently conformable strip of masking material having a width greater than the maximum distance between the trailing edge of the front door adjacent the "B" post and the leading edge of the rear door adjacent the "B" post and a length at least equal to the length of those edges along the "B" post to be masked, which strip has pressure sensitive adhesive on a surface adjacent a longitudinal edge of the strip; (2) opening the front door; (3) applying the strip to the inner surface of the leading edge of the rear door so that the pressure sensitive adhesive securely adheres the strip to conform with the profile of the leading edge and the strip extends across the "B" post to an extent sufficient to overlap with the trailing edge of the front door when said front door is closed; and (4) closing the front door to abut the overlap and thereby mask the "B" post.

15 Claims, 2 Drawing Sheets

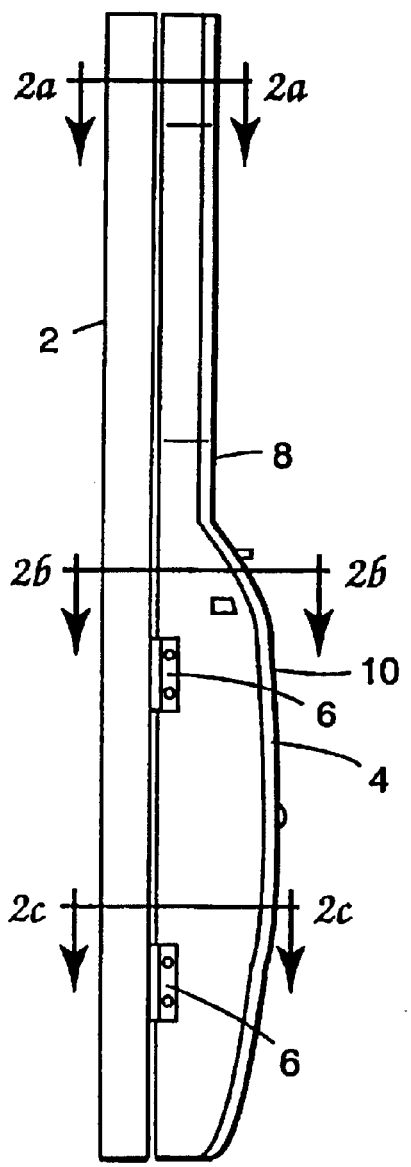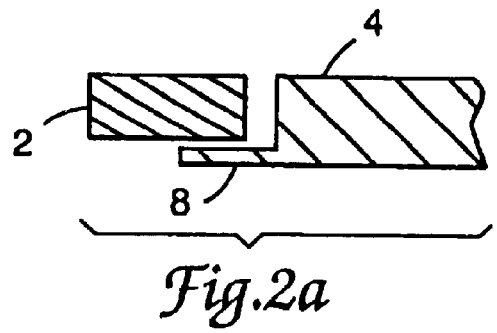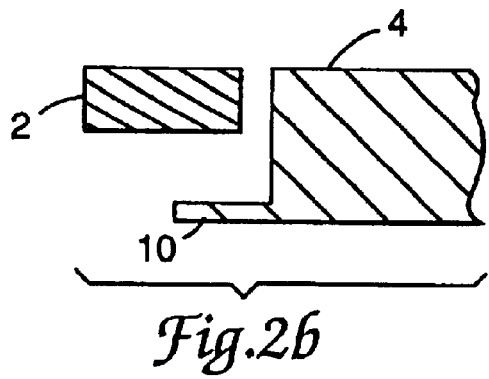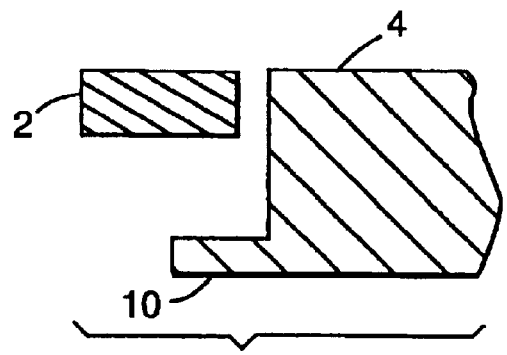
Fig.1
Fig.2a
Fig.2b
Fig.2c

US 6,759,089 B2

MASKING METHOD

CROSS REFERENCE TO RELATED APPLICATION

This application is a continuation of U.S. patent application Ser. No. 08/682,773 filed Jul. 30, 1996, now abandoned which was a national stage application submitted under 37 U.S.C. 371 of International Application No. PCT/US95/02893 filed Mar. 2, 1995, and claiming a Priority date of Mar. 8, 1994, on British patent Application No 9404417.9.

FIELD OF THE INVENTION

This invention relates to a method of masking a vehicle during spray painting and in particular to a method of masking the "B" post of a vehicle.

BACKGROUND OF THE INVENTION

The "B" post of a vehicle is the pillar situated between the rear edges of the front door and leading edge of the rear door of a vehicle. The "B" post often supports the hinges of the rear door and the fastening catch for the front door. When re-spraying door panels it is necessary to mask the "B" post in such a way as to prevent overspray going through the gap between the front and rear doors. This is a difficult area to mask since the "B" post is often irregularly shaped and dirty and will not readily accept conventional masking materials having pressure sensitive adhesive. Also, the door panels are generally spaced some distance from the "B" post and it is not possible to rely upon the door holding masking material in place by compressing the material against the "B" post with the edge of the door.

DISCLOSURE OF THE INVENTION

The present invention provides a simple, effective technique for masking "B" posts.

Therefore, according to the present invention there is provided a method of masking a vehicle "B" post comprising the steps of:

providing a resiliently conformable strip of masking material having a width greater than the maximum distance between the trailing edge of the front door adjacent the "B" post and the leading edge of the rear door adjacent the "B" post and a length at least equal to the length of the "B" post to be masked, the strip having pressure sensitive adhesive on a surface adjacent a longitudinal edge of the strip, opening said front door, applying said strip to the inner surface of the leading edge of the rear door so that the pressure sensitive adhesive securely adheres the strip to conform with the profile of the leading edge and the strip extends across the "B" post to an extent sufficient to overlap with the trailing edge of the front door when said front door is closed, and closing the front door to abut said overlap thereby masking the "B" post.

It has been found that by selecting a resiliently conformable masking material e.g. foam strip, thick paper scrim, non-woven material etc., it is readily possible to adhere the masking material to the inner surface of the leading edge of the rear door by pressure sensitive adhesive so that the masking material projects across the "B" post and will maintain this configuration. The front door is closed over the overlapping portion of the masking material. The masking material is sufficiently stiff not to be displaced by the pressure of the paint spray thereby effectively masking the "B" post and preventing ingress of overspray inside the doors.

The masking material is generally has a stripe of pressure sensitive adhesive of from 8 to 12 mm wide adjacent one longitudinal edge, normally within 2 mm of the edge. In one embodiment the strip may have a second adhesive strip adjacent the other longitudinal edge for adhering to the inside of the trailing edge of the front door. The additional adhesive strip may have a width of from 8 to 12 mm and is normally positioned with 2 mm of the other edge.

The masking strip may conveniently be provided in the form of a roll wound upon itself, optionally about a core. Therefore according to a further aspect of the invention there is provided a roll of masking material comprising a foam strip wound upon itself, the foam strip having a width of from 20 to 40 mm, a thickness of from 10 to 20 mm and pressure sensitive adhesive on a major surface adjacent a longitudinal edge. The masking material may conveniently be formed from foam web by the process disclosed in EP 0384626 (the content whereof is incorporated herein by reference).

The strips may be formed in a parallel array each strip being separable. Therefore according to a further aspect of the invention there is provided a roll of masking material comprising a parallel array of foam strips conjoined and manually separable, each foam strip having a width of from 20 to 40 mm, a thickness of from 10 to 20 mm and pressure sensitive adhesive on a major surface adjacent a longitudinal edge. The array may be formed by applying an adhesive to a foam web and slitting the web. Alternatively, the array may be formed in accordance with EP 0384626, which results in an array in which the strips have an elliptical or oval cross-section and adjacent strips are joined by longitudinal welded seams that maintain the curvature of the strips.

BRIEF DESCRIPTION OF THE DRAWING

The invention will now be described with reference to the accompanying drawings in which:

FIG. 1 represents an end view of the rear door of a vehicle and associated end post, FIGS. 2(a), (b) and (c) represent cross-sections through 2a—2a, 2b—2b and 2c—2c of FIG. 1.

DETAILED DESCRIPTION OF THE INVENTION

Figure 3:
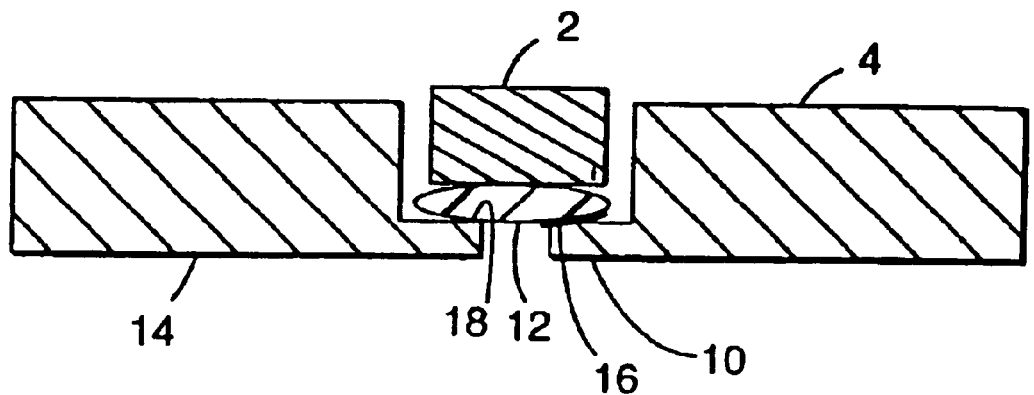
FIG. 3 represents a cross-section through a "B" post and front and rear doors showing the masking in accordance with the invention.

Referring to FIGS. 1 and 2, the "B" post 2 supports the rear door 4 which is mounted by hinges 6. The upper portion of the door 8 adjacent the window is adjacent the "B" post 2 whilst the lower panel 10 of the door extends away from the "B" post such that there is a significant gap between the "B" post and the edge of the door panel 10.

Figure 4:
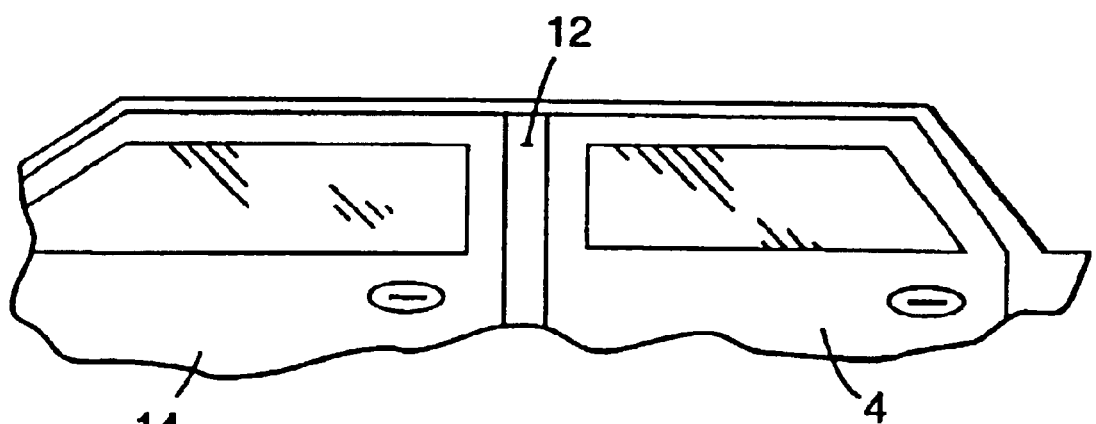
FIG. 4 represents a partial side view of a vehicle showing the front and rear doors.

FIGS. 3 and 4 show the masking material 12 in position masking the "B" post 2. The front door 14 is opened and the masking strip 12 is positioned between the "B" post 2 and the edge of the rear door 4 such that the strip of adhesive 16 is adhered to the edge of the door 4, particularly in the region of the bottom panel 10. If necessary, the rear door 4 can be opened to facilitate positioning of the masking strip 12. The masking strip 12 will follow the contour of the rear door 4 which is identical to that of the edge 18 of the front door 14. Thus, when the front door 14 is closed the edge 18 will abut the masking strip 12 thereby completing a seal. In one embodiment, the masking strip will include a strip of pressure sensitive adhesive in the region of contact with the edge 18 of the front door 14. The masking material is sufficiently resilient to maintain its position around the contour of the lower panel 10 during the paint spraying operation thereby preventing ingress of paint to the "B" post and interior of the vehicle.

What is claimed is:

1. A method of masking a vehicle "B" post comprising the steps of:

providing a resiliently conformable length of masking material comprising an elongate strip of polymeric foam having first and second major opposite surfaces extending between opposite first and second edge surfaces, a width between said edge surfaces greater than the maximum distance between the trailing edge of a front door adjacent the "B" post and the leading edge of a rear door adjacent the "B" post, a width between said edge surfaces greater than the thickness between said front and rear surfaces, and a length at least equal to the length of the "B" post to be masked, the strip having pressure sensitive adhesive on said first major surface adjacent said first edge surface of the strip, and being free of adhesive on said first major surface along a stripe adjacent said second edge surface of the strip, opening the front door, applying the strip to an inner surface of the leading edge of the rear door so that the pressure sensitive adhesive securely adheres the strip to conform with the profile of the leading edge and the adhesive free stripe of the first major surface projects across the "B" post to an extent sufficient to overlap the trailing edge of the front door with a portion of the adhesive free strip in the space between the front and rear doors when the front door is closed, and closing the front door to abut the projecting portion of the strip to mask the "B" post against materials being sprayed on the outer surfaces of the doors.

2. A method according to claim 1 wherein said strip has a width in the range 20 to 40 mm and a thickness of from 10 to 20 mm between said first and second surfaces, and the pressure sensitive adhesive is in a stripe having a width of from 8 to 12 mm.

3. A method according to claim 1 wherein the foam is a polyester polyurethane foam.

4. A length of masking material adapted for masking a "B" post of an automobile, said length of masking material comprising an elongate strip of polymeric foam having longitudinally extending first and second major surfaces extending between first and second edge surfaces on opposite sides of said major surfaces, said major surfaces having widths of from 20 to 40 mm between said edge surfaces, said foam strip having a thickness between said major surface of at least 10 mm and less than the widths of said major surfaces, and said length of masking material including a longitudinally extending layer of pressure sensitive adhesive on said first major surface adjacent said first edge and being free of adhesive on said first major surface along a stripe adjacent said second edge surface of the strip.

5. A length of masking material according to claim 4 wherein said length of masking material is a part of a parallel array of conjoined and manually separable lengths of masking material, each having the structure claimed in claim 4.

6. A length of masking material according to claim 5 wherein adjacent strips are joined by longitudinal welded seams that maintain the shape of the strips.

7. A length of masking material according to claim 4 wherein said strip has a width of about 26 mm.

8. A length of masking material according to claim 4 wherein said strip has a rectangular, elliptical or oval cross-section.

9. A length of masking material according to claim 4 wherein the pressure sensitive adhesive is in a stripe having a width of from 8 to 12 mm.

10. A length of masking material according to claim 4 wherein said foam is a polyester polyurethane foam.

11. In combination:

A vehicle having a closed front door with opposite outer and inner surfaces and a trailing edge, and a closed rear door with opposite outer and inner surfaces and a leading edge, said trailing and leading edges defining a space between said doors, and said vehicle including a "B" post having a length extending along said space with said "B" post being spaced from said inner surfaces of said doors; and a resiliently conformable length of masking material comprising an elongate strip of polymeric foam having longitudinally extending opposite first and second major surfaces extending between first and second edge surfaces on opposite sides of said major surfaces, said major surfaces having widths of from 20 to 40 mm between said edge surfaces, said foam strip having a thickness between said major surfaces of at least 10 mm and less than the widths of said major surfaces, and said length of masking material including pressure sensitive adhesive on said first major surface adjacent said first edge and being free of adhesive on said first surface along a stripe adjacent said second edge surface of the strip, said pressure sensitive adhesive securely adhering the strip of polymeric foam to the inner surface of the rear door in conformation with the profile of said leading edge and with the adhesive free stripe of said first surface projecting across the "B" post and overlapping the trailing edge of the front door with the inner surface of the front door abutting the overlapping portion of the strip and with a portion of the adhesive free strip in the space between the front and rear doors to mask the "B" post against materials being sprayed on the outer surfaces of the doors.

12. A combination according to claim 11 wherein said strip has a thickness of from 10 to 20 mm between said first and second surfaces, and the pressure sensitive adhesive is in a stripe having a width of from 8 to 12 mm.

13. A combination according to claim 11 wherein said strip has a width of about 26 mm.

14. A combination according to claim 11 wherein said strip has a generally rectangular, oval or elliptical cross-section.

15. A combination according to claim 11 wherein said foam is a polyester polyurethane foam.

* * * * *